3,456,015
PROCESS FOR PRODUCTION OF ALLENE KETONES
Roman Marbet, Riehen, Switzerland, assignor to Hoffmann-La Roche Inc., Nutley, N.J., a corporation of New Jersey
No Drawing. Filed Feb. 8, 1965, Ser. No. 431,175
Claims priority, application Switzerland, Feb. 25, 1964, 2,290/64
Int. Cl. C07c *45/02*
U.S. Cl. 260—586     1 Claim

ABSTRACT OF THE DISCLOSURE

Allene ketones of the formula:

$$R'CH=C=CH-\underset{R_2}{CH}-\overset{O}{\overset{\|}{C}}-CH_2R^3$$

wherein R', $R^2$ and $R^3$ are hydrocarbon groups are prepared by heating a ketal of the formula:

$$HO\equiv C-\underset{}{\overset{R'}{\underset{|}{CH}}}-O-\underset{CH_2R^3}{\overset{CH_2R^2}{\underset{|}{C}}}-OR$$

wherein R is a lower alkyl group and R', $R^2$ and $R^3$ are as defined above, at temperatures from about 80° C. to about 200° C. in the presence of an acid catalyst.

---

This invention relates to polyene ketones and to processes for their preparation. More particularly, the invention relates to allene ketones of the formula:

$$R^1CH=C=CH-\underset{R^2}{CH}-\overset{O}{\overset{\|}{C}}-CH_2R_3 \qquad (IV)$$

and α,β-γ,δ- and β,γ-δ,ε-unsaturated ketones of the Formulae V and VI, respectively, which are obtainable therefrom by rearrangement of one of the allene double bonds:

$$R^1CH=CH-CH=\underset{R^2}{\overset{}{C}}-\overset{O}{\overset{\|}{C}}-CH_2R^3 \qquad (V)$$

$$R^{11}=CH-CH=CH-\underset{R^2}{CH}-\overset{O}{\overset{\|}{C}}-CH_2R^3 \qquad (VI)$$

In the above Formulae IV–VI, $R^1$ is a hydrocarbon group having from 1 to 12 carbon atoms, for example, a saturated or mono-olefinically unsaturated aliphatic or cycloaliphatic, straight or branched chain hydrocarbon group such as a lower alkyl group (e.g., methyl, ethyl, propyl, isopropyl, butyl, isobutyl, etc.), a lower alkenyl group (e.g., cyclopentyl, cyclohexyl), or a monocyclic lower alkyl residue (e.g., cyclopentyl, cyclohexyl), or an aromatic or araliphatic hydrocarbon group (such as a phenyl or benzyl group). $R^2$ and $R^3$ are hydrogen or a lower saturated or monoolefinically unsaturated hydrocarbon group, for example, lower alkyl or lower alkenyl groups (e.g., methyl, ethyl, propyl, allyl, etc.), or $R^2$ together with $R^3$ can be a polymethylene group, for example, a di- or trimethylene group. $R^{11}$ can be an alkylidene group with at least 2 carbon atoms (e.g., up to 7 carbon atoms, such as ethylidene, propylidene, etc.), a $C_3$–$C_7$ alkenylidene group, i.e., an alkylidene group having from 3 to 7 carbon atoms and a single double bond (e.g., 1,4-dimethyl-3-penten-1-ylidene) or a cycloalkylidene group (e.g., cyclohexylidene).

The process in accordance with the invention is carried out by reacting a secondary propargyl alcohol of Formula I:

$$HC\equiv C-\underset{R^1}{\overset{}{\underset{|}{CH}}}-OH \qquad (I)$$

wherein $R^1$ has the above meaning in the presence of an acid catalyst with an alkyl enol ether or a dialkyl ketal of an aliphatic or cycloaliphatic ketone, especially with an enol ether of Formula IIa or a ketal of Formula IIb:

$$\underset{CH_2R^3}{\overset{CHR^2}{\underset{|}{\overset{\|}{C}-OR}}} \qquad (IIa)$$

$$RO-\underset{CH_2R^3}{\overset{CH_2R^2}{\underset{|}{\overset{|}{C}-OR}}} \qquad (IIb)$$

wherein R is a lower alkyl group and $R^2$ and $R^3$ have the above meaning to form a ketal, and then heating the resulting ketal to form an allene ketone of Formula IV. The allene ketone can then optionally be isomerized into an α,β-γ,δ- or a β,γ-δ,ε-unsaturated ketone of Formulae V and VI, respectively.

The term "lower alkyl" used in the specification is to be understood to mean a straight or branched chain alkyl group having from 1 to 7 carbon atoms, e.g., methyl, ethyl, isopropyl, butyl, hexyl, etc.

Examples of secondary propargyl alcohols of Formula I are: 1-butyn-3-ol, 1-pentyl-3-ol, 4-methyl-1-pentyn-3-ol, 1-hexyn-3-ol, 3-cyclohexyl-1-propyn-3-ol, 3-cyclohexenyl-1-propyn-3-ol, 3-phenyl-1-propyn-3-ol, 7-methyl-6-octen-1-yn-3-ol, 4,7-dimethyl-6-octen-1-yn-3-ol, 4-ethyl-7-methyl-6-octen-1-yn-3-ol, 6,7-dimethyl-6-octen-1-yn-3-ol, 7,9-dimethyl-6-decen-1-yn-3-ol, 6-cyclohexyliden-1-hexyn-3-ol.

Examples of alkyl enol ethers and dialkyl ketals of the Formulae IIa and IIb, respectively, are:

| Enol ethers | Ketals |
| --- | --- |
| 2-alkoxy-1-propene | 2,2-dialkoxy-propane |
| 2-alkoxy-2-butene | 2,2-dialkoxy-butane |
| 2-alkoxy-2-pentene | 2,2-dialkoxy-pentane |
| 3-alkoxy-3-pentene | 3,3-dialkoxy-pentane |
| 1-alkoxy-1-cyclopentene | 1,1-dialkoxy-cyclopentane |
| 1-alkoxy-1-cyclohexene | 1,1-dialkoxy-cyclohexane |

As acidic catalysts there can be employed, for example, mineral acids (such as sulfuric acid or phosphoric acid), acid salts (such as potassium bisulfate), strong organic acids (such as oxalic acid, trichloroacetic acid, and especially p-toluenesulfonic acid), as well as so-called Lewis acids (such as zinc chloride or boron trifluoride etherate). When acid sensitive substances are present in the reaction mixture, it is advantageous to partly neutralize the acid by the addition of a weakly basic compound such as, for example, pyridine.

The reaction of the secondary propargyl alcohol of Formula I with the dialkyl ketal or preferably the alkyl enol ether in the presence of an acidic catalyst usually proceeds strongly exothermically and leads primarily to a mixed ketal of the Formula IIIa:

$$HC\equiv C-\underset{}{\overset{R^1}{\underset{|}{CH}}}-O-\underset{CH_2R^3}{\overset{CH_2R^2}{\underset{|}{\overset{|}{C}-OR}}} \qquad (IIIa)$$

wherein R through $R^3$ have the above meaning.

These mixed ketals of Formula IIIa are relatively stable compounds at room temperature and also at temperatures up to about 100° C. and can be isolated from the reaction mixture in pure form if desired (e.g., by distillation). However, isolation from the reaction mixture is not necessary, and is even undesirable for the less stable member of this group, such as acetone-(3-phenyl-1-propyn-3-yl) methyl ketal of the formula $$HC{\equiv}C-CH(C_6H_5)-O-C(CH_3)_2-OCH_3$$

which tends to decompose more or less extensively into its starting components (propargyl alcohol and enol ether) upon attempting its isolation by distillation.

In addition to the mixed ketals of Formula IIIa, there can also result by transketalization (i.e., exchange of the R-group of the mixed ketal by the hydrocarbon residue of the propargyl alcohol employed) ketals of the Formula IIIb:

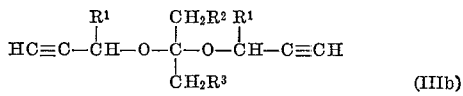

wherein $R^1$, $R^2$, and $R^3$ have the above meaning, certain of which [when $R^1{=}CH_3$ and $R^2$ and $R^3{=}H$ or together${=}-(CH_2)_3-$] are sufficiently stable to be capable of being isolated from the reaction mixture by distillation without great loss. Thus, for example, upon admixture of 1-butyn-3-ol with isopropenyl methyl ether $$[CH_2{=}C(CH_3)OCH_3]$$

in the presence of a trace of acid there results in a strongly exothermic reaction both acetone-(1-butyn-3-yl) methyl ketal [mixed ketal of the formula $$HC{\equiv}C-CH(CH_3)-O-C(CH_3)_2-OCH_3]$$

and the symmetrical acetone di(1-butyn-3-yl) ketal of the formula $$HC{\equiv}C-CH(CH_3)-O-C(CH_3)_2$$
$$-O-CH(CH_3)-C{\equiv}CH$$

The ketals which primarily result (i.e., the ketals of Formulae IIIa and IIIb) are converted by means of acid catalysts and sufficiently high temperatures, with alcohol cleavage and rearrangement of the alcohol cleavage products, into the corresponding allene ketones of Formula IV. As a rule, temperatures between about 80 and about 200° C. are employed for this transformation of the ketals into the allene ketones. Thus, for example, the ketal-containing reaction mixture which is primarily obtained can be heated to boiling under reflux or if no allene ketone forms at the boiling temperature, the reaction mixture can be heated to the requisite elevated temperature in a closed vessel, if necessary, under the pressure of an inert gas (preferably nitrogen). The reaction is preferably carried out under pressure when the boiling point of the solvent or the reaction components used lies below about 80° C.

As pointed out above, in order to obtain the allene ketones it is neither necessary nor convenient to isolate the mixed ketals which primarily result (or the symmetrical ketals which may form therefrom). On the contrary, according to a preferred process, the starting materials (propargyl alcohol and enol ether or ketal) are mixed with one another in the presence of the acidic catalyst and then, after the exothermic ketal-forming reaction diminishes, the reaction mixture is heated under reflux or in a closed vessel for some time (e.g., one to several hours), for example, at temperatures of about 80 to about 200° C.

According to an especially preferred mode of carrying out the process of the invention, about 2 moles of the enol ether component are used per mole of propargyl alcohol. The excess enol ether is capable of combining with ketal formation with the alcohol (ROH) which cleaves off in the conversion of the primary resulting ketal into the allene ketone. The alcohol which becomes free is thus extracted in a desirable way from the reaction equilibrium. Thus, for example, by the reaction of one mole of 1-butyn-3-ol with 2 moles of isopropenyl methyl ether in the presence of an acidic catalyst and with heating of the reaction mixture, there result, as the main products of the reaction, the desired 4,5-heptadien-2-one (allene ketone) and, by addition of the methanol which cleaves off to the excess isopropenyl methyl ether, the dimethyl ketal of acetone.

Where the desired allene ketone can not easily be separated by distillation from the ketal which simultaneously results or from unreacted ketal intermediate product, it is recommended to first saponify the ketal to the corresponding ketone. The saponification can be effected in a known manner by means of acids (e.g., sulfuric acid). This procedure is recommended, for example, for the isolation of 2-(2,3-butadienyl)cyclohexanone from the reaction mixture obtained by the reaction of 1-butyn-3-ol with 2 mole equivalents of cyclohexenyl n-butyl ether which contains the di-n-butyl ketal of cyclohexanone in addition to the named allene ketone, or, for example, for easier separation of 6-cyclohexyl-4,5-hexadien-2-one (allene ketone) from unreacted acetone-(3-cyclohexyl-1-propyn-3-yl) methyl ketal (ketal intermediate product).

The allene ketones obtained may be rearranged by means of strong acidic or strong alkaline agents to the corresponding compounds having conjugated ethylene bonds, namely, to the $\alpha,\beta{-}\gamma$, $\delta$- or to $\beta,\gamma{-}\delta$, $\epsilon$-unsaturated ketones of Formulae V and VI. Thus, for example, the allene ketone (4,5-octadien-2-one) obtainable by reaction of 1-pentyl-3-ol with isopropenyl methyl ether is isomerizable to $\alpha,\beta{-}\gamma$, $\delta$-unsaturated 3,5-octadien-2-one and to $\beta,\gamma{-}\delta$, $\epsilon$-unsaturated 4,6-octadien-2-one. It is to be kept in mind, however, that not all ketones are rearrangeable to $\beta,\gamma{-}\delta$, $\epsilon$-unsaturated ketones. Thus, for example, for obvious reasons, no such isomers form from compounds in which $R^1$ is phenyl, nor likewise from compounds with $R^1{=}CH_3$. For the rest, partial or practically complete isomerization of the allene ketone can also be effected in situ under the influence of acidic catalysts and high temperatures. Thus, for example, 6-phenyl-3,5-hexadien-2-one (conjugated diene ketone) can be obtained directly by heating 1-propyn-3-phenyl-3-ol with isopropyl methyl ether under pressure in the presence of p-toluenesulfonic acid and pyridine. Also, for example, by the reaction in accordance with the invention of 1-pentyn-3-ol with isopropenyl methyl ether there results, in addition to the allene ketone (4,5-octadien-2-one), also 4,6-octadien-2-one as the by-product. It appears from these findings that the allene ketones are isomerized chiefly to $\beta,\gamma{-}\delta$, $\epsilon$-unsaturated ketones under the influence of acids. On the other hand the treatment of the allene ketones with alkalis favors the isomerization to the $\alpha,\beta{-}\gamma$, $\delta$-unsaturated ketones. As alkaline isomerization agents there are suitable, for example, alkali metal hydroxides or alcoholates (e.g., sodium or potassium hydroxide) in lower alcoholic (e.g., methanolic) solution. The isomerization under the influence of alkalis is usually very easily effected, in many cases proceeding exothermically. Strong acids that can be employed include mineral acids, e.g., HCl, $H_2SO_4$, etc., and sulfonic acids, e.g., aromatic sulfonic acids.

4,5-heptadien-2-one does not rearrange to the corresponding $\beta,\gamma{-}\delta$, $\epsilon$-unsaturated ketone (like compounds of the Formula IV with $R^1{=}CH_3$ as already noted above). A rearrangement to the $\alpha,\beta{-}\gamma$, $\delta$-unsaturated ketone (3,5-heptadien-2-one) occurs practically exclusively not only under the influence of acidic but also of alkaline isomerization agents. The alkaline isomerization here, however, also gives a result different from the acidic isomerization inasmuch as the alkali treatment chiefly leads to a 3,5-heptadien-2-one with trans-configuration in the 3,4- and cis-configuration in the 5,6-position, whereas the influence of acidic agents (such as, for example, the acidic catalysts employed in accordance with the invention) chiefly leads to a 3,5-heptadien-2-one with cis-configuration in the 3,4- and trans-configuration in the 5,6-position.

The secondary propargyl alcohols used as starting materials can be obtained in a known manner by ethynylation of the corresponding aldehyde with acetylene. The reaction components ketone enol ether or ketal reactants can be prepared according to known methods by ketalization of the corresponding ketones followed by the splitting off of one molecule of alcohol (when an enol ether is desired).

The ketones of Formulae IV, V, and VI are characterized by especially valuable odor properties which differ from those of structurally closely related compounds. Thus, for example, 7,10-dimethyl-4,5,9-undecatrien-2-one within the scope of the instant invention has a pleasant caramel-like odor, while 6,10-dimethyl-4,5,9-undecatrien-2-one, which is isomeric thereto, differing only in the position of a methyl group, has an unpleasant metallic, ozone-like odor. Just as significant a qualitative difference exists, for example, between the odor notes of 7,10-dimethyl-3,5,9-undecatrien-2-one obtainable in accordance with the invention and 6,10-dimethyl-3,5,9-undecatrien-2-one (pseudoionone) in that the first shows a dry woodlike odor without a balsamic note. The latter, however, as is known, shows a fatty balsamic somewhat cinnamon-like odor. The ketals primarily resulting by reaction of the starting materials also have odorant character and can accordingly find use for the manufacture of perfumes or perfumed products. Hence, the ketones of Formulae IV, V, and VI, and the ketals of Formulae IIIa and IIIb are useful as odorants for perfumes and perfume products.

In the following examples the temperatures are given in degrees centigrade.

EXAMPLE 1

(a) Preparation of acetone-(1-butyn-3-yl) methyl ketal and acetone-di(1-butyn-3-yl) ketal To 70 g. of 1-butyn-3-ol there are added 20 mg. of p-toluene-sulfonic acid and thereafter at 0–10°, 170 g. of isopropenyl methyl ether. As soon as the evolution of heat has died away, the reaction mixture is neutralized with 0.5 ml. of triethyl amine and then shaken with 250 ml. of petroleum ether and 250 ml. of 10 percent sodium bicarbonate solution. The petroleum ether solution is dried over anhydrous sodium bicarbonate and then distilled, whereby, after removal of the solvent, two fractions are obtained:

(1) Fraction: acetone-(1-butyn-3-yl) methyl ketal of boiling point 41°/14 mm.; $n_D^{20}$=1.4187; $d^{24}$=0.89. Harsh, fruit-like odor with nut and Russian leather-like side notes.

(2) Fraction: acetone-di(1-butyn-3-yl) ketal of boiling point 75°/15 mm.; $n_D^{20}$=1.4401; $d^{24}$=0.90.

I.R.: spectrum: acetylene bands at 3.04$\mu$ and 4.74$\mu$; strong ether band in the region of 9$\mu$. Odor: very fresh and green fruity.

(b) Preparation of 4,5-heptadien-2-one 1-butyn-3-ol can be converted with isopropenyl methyl ether into 4,5-heptadien-2-one without isolation of the ketal intermediate product as follows:

To a solution of 20 mg. of p-toluenesulfonic acid in 70 g. of 1-butyn-3-ol there are added with stirring and cooling 170 g. of isopropenyl methyl ether. The reaction mixture is thereupon enclosed in a pressure vessel. After the impressing of 5 atm. of nitrogen, the reaction mixture is heated at 180° for 3 hours, thereafter cooled and twice washed with 250 ml. of 5 percent sodium bicarbonate solution, whereupon first the acetone dimethyl ketal and then the 4,5-heptadien-2-one (90 g.) is distilled off. Pure 4,5-heptadien-2-one has the following properties: boiling point=56°/15 mm.; $n_D^{20}$=1.4684; $d^{23}$=0.89.

Odor: reminiscent of 6-methyl-5-hepten-2-one, but harsher and slightly fatty. I.R. spectrum: allene band at 5.06$\mu$; band of the nonconjugated carbonyl at 5.82$\mu$. Melting point of the phenyl-semicarbazone=117–119°.

(c) Preparation of 3,5-heptadien-2-one 70 g. of 1-butyn-3-ol are allowed to react between 0 and 30° with 200 g. of isopropenyl ethyl ether in the presence of 20 mg. of p-toluenesulfonic acid. Thereupon the mixture is heated at 150° for 30 minutes in the autoclave. The cooled mixture is then allowed to flow at 0–10° into a solution of 30 percent aqueous caustic soda in 200 ml. of methanol for purpose of isomerization of the allene ketone. After 15 minutes the mixture is neutralized with glacial acetic and the excess isopropenyl ethyl ether and the acetone diethyl ketal produced are evaporated off at 100 mm. pressure in a 60° bath. Thereafter the 3,5-heptadien-2-one is separated at 15 mm. pressure in a 100° bath as a pale yellow colored liquid. Yield: 89 g.; boiling point=68–69°/15 mm.; $n_D^{20}$=1.5197; $d^{23}$=0.88; UV spectrum in ethanol: maximum at 274m$\mu$, $E_1^1$=2250.

I.R. spectrum: band of the conjugated carbonyl at 6.02$\mu$; band of the conjugated ethylene bonds at 6.12$\mu$. On the basis of the NMR spectrum, an isomer mixture is obtained in which the isomer with the trans-configuration in the 3,4- and cis-configuration in the 5,6-position is the main product. Odor: harsh fruity and bitter almond-like.

The isomeric 3,5-heptadien-2-one with cis-configuration in the 3,4- and trans-configuration in the 5,6-position can be obtained as follows:

To 70 g. of 1-butyn-3-ol there are added 200 mg. of p-toluene-sulfonic acid and 2 ml. of pyridine. After addition of 170 g. of isopropenyl methyl ether the mixture is heated in the autoclave under 2 atm. of nitrogen first of all to 100°, whereby a sudden exothermic reaction commences (increase of the internal temperature to 158°) (no reaction takes place at room temperature). After this reaction fades away, the reaction mixture is heated at 180° for half hour. A product is thus obtained which, in the gas chromatogram, shows a peak which is almost completely missing with the 3,5-heptadien-2-one described above, directly behind the position of the 4,5-heptadien-2-one. After working up and distillation through a column, there is obtained pure 3,5-heptadien-2-one of boiling point 55°/13 mm. in a yield of 77 g.; $n_D^{20}$=1.5080; $d^{23}$=0.90. UV spectrum in ethanol: maximum at 277 m$\mu$; $E_1^1$=1.580. Odor: fruit-like of gooseberries, slightly woody.

EXAMPLE 2

(a) Preparation of 2-(2,3-butadienyl)-cyclohexanone 70 g. of 1-butyn-3-ol are reacted with 480 g. of cyclohexenyl n-butyl ether in the presence of 100 mg. of p-toluenesulfonic acid. Thereby there results, by exothermic reaction, the mixed cyclohexanone-(1-butyn-3-yl) n-butyl ketal and also to some extent the symmetrical cyclohexanone-di(1-butyn-3-yl) ketal.

The reaction mixture is now heated at 100° in a flask for 1.5 hours with stirring (an autoclave is not necessary here), whereby a complete transformation of the ketal intermediate product into 2-(2,3-butadienyl)-cyclohexanone occurs. Since the subsequent separation of this allene ketone from the simultaneously formed cyclohexanone di-n-butyl ketal by distillation is difficult, the cyclohexanone di-n-butyl ketal is first saponified to the ketone. For this purpose, the reaction mixture is mixed with 200 ml. of 10 percent sulfuric acid and briefly shaken with 600 ml. of acetone. The resulting clear solution is treated with 1000 ml. of water and extracted three times with 200 ml. of petroleum ether each time. The combined petroleum ether extracts are washed twice with 200 ml. of 10 percent sodium bicarbonate solution and then distilled. First petroleum ether, butanol and cyclohexanone are separated at 16 mm. in the 120° bath, where after the 2-(2,3-butadienyl)-cyclohexanone is obtained at 0.1 mm. Yield: 112 g.; boiling point=61°/0.1 mm.; $n_D^{20}$=1.5022; $d^{23}$=0.95. Melting point of the phenyl-semicarbazone=139–140°. I.R. spectrum: strong allene band at 5.07$\mu$, band of the nonconjugated carbonyl at 5.84$\mu$. Odor: fresh and harsh fruit-like smoky, slightly fatty; of interest for tobacco and Russian leather bases.

The same compound is obtained when a mixture of 70 g. of 1-butyn-3-ol, 30 mg. of p-toluenesulfonic acid and 250 g. of cyclohexanone di-n-butyl ketal is heated in a pressure vessel to 180° under 2 atm. of $N_2$ for 3 minutes, then immediately again cooled to room temperature and the reaction mixture worked up as previously described. The yield of 2-(2,3-butadienyl)-cyclohexanone amounts to 64 g.

(b) The so-obtained allene ketone can be isomerized to the corresponding conjugated diene ketone [i.e., to 2-(2-butenylidene)-cyclohexanone] as follows:

To 60 g. of 2-(2,3-butadienyl)-cyclohexanone there is added a solution of 0.6 g. of sodium hydroxide in 60 ml. of methanol. The isomerization occurs with immediate exothermic reaction to 50°. The reaction mixture is neutralized with glacial acetic and thereafter the methanol and then the 2-(2-butenylidene)-cyclohexanone are distilled off. Yield: about 50 g.; boiling point=52°/0.06 mm.; $n_D^{20}=1.5452$; $d^{23}=0.96$. UV spectrum in ethanol; maximum at 287 m$\mu$, $E_1^1=850$. I.R. spectrum; band of the conjugated carbonyl at 5.97$\mu$, band of the conjugated ethylene bonds at 6.13$\mu$. Odor: harsh, woody, fruity.

EXAMPLE 3

(a) Preparation of acetone-(1-pentyn-3-yl) methyl ketal 84 g. of 1-pentyn-3-ol and 100 mg. of p-toluenesulfonic acid are mixed up by stirring at 0–30° with 144 g. of isopropenyl methyl ether. The reaction mixture is neutralized by addition of 1 ml. of triethyl amine and then shaken out twice with 10 percent soda solution. After washing out with petroleum ether and distillation through a column, acetone-(1-pentyn-3-yl) methyl ketal

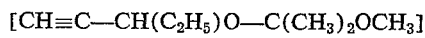

is obtained as a colorless liquid of boiling point 65°/24 mm.; $n_D^{20}=1.4266$; $d^{24}=0.89$; fresh, harsh fruit-like odor with side notes of Russian leather and mignonette.

The 1-pentyn-3-ol used as starting material can be obtained in a known manner by ethynylation of propionaldehyde with acetylene. Boiling point=38–39°/16 mm.; $n_D^{20}=1.4344$; $d^{20}=0.88$.

(b) Preparation of 4,5-octadien-2-one

To 84 g. of 1-pentyn-3-ol there are added 20 mg. of p-toluenesulfonic acid and thereafter at 0–30° 170 g. of isopropenyl methyl ether. Without isolation of the primarily resulting mixed ketal [acetone-(1-pentyn-3-yl) methyl ketal] the reaction mixture is now heated in a pressure vessel for 1 hour at 150° under 5 atm. of nitrogen. After cooling, the mixture is neutralized with triethyl amine, then washed with sodium bicarbonate solution and distilled. 120 g. of crude 4,5-octadien-2-one with the refraction $n_D^{20}=1.4594$ are obtained. This allene ketone can be further purified by fractionation. Boiling point=69°/15 mm.; $n_D^{20}=1.4695$; $d^{24}=0.87$. Original nut-like odor. I.R. spectrum: allene band at 5.11$\mu$; band of the nonconjugated carbonyl at 5.87$\mu$. Melting point of the phenyl-semicarbazone=103°.

(c) Preparation of 3,5-octadien-2-one

The reaction mixture obtained in accordance with the process of preceding paragraph (b) by 1 hour heating of 1-pentyn-3-ol, p-toluenesulfonic acid and isopropenyl ether at 150° is, without further working up, poured at 20–30° into a solution of 2 g. of potassium hydroxide in 200 ml. of methanol, whereby the isomerization of 4,5-octadien-2-one to the 3,5-octadien-2-one occurs exothermically. After 15 minutes the isomerization product is neutralized with glacial acetic acid. The solution is then evaporated on the 50° bath at 16 mm. The remaining oil is purified by distillation. According to the gas chromatogram, the so-obtained 3,5-octadien-2-one consists essentially of two cis-trans-isomeric components. Boiling point=84–85°/16 mm.; $n_D^{20}=1.5122$; $d^{24}=0.87$. UV spectrum in ethanol; maximum at 274 m$\mu$; $E_1^1=1880$. I.R. spectrum; band of the conjugated carbonyl at 6.00$\mu$, band of the conjugated ethylene bonds at 6.15$\mu$. Odor: powerful, harsh, fruit-like.

(d) Preparation of 4,6-octadien-2-one 84 g. of 1-pentyn-3-ol are mixed with 100 mg. of phosphoric acid and 170 g. of isopropenyl methyl ether at a temperature between 0 and 30°. The mixture is heated at 180° for 1.5 hours in a pressure vessel under 2 atm. of nitrogen. The allene ketone (4,5-octadien-2-one) primarily resulting from this reaction is rearranged directly to 4,6-octadien-2-one under the influence of the acid and the high temperature. After cooling there is therefore obtained a reaction mixture which only shows traces of the allene ketone in the gas chromatogram. After working up and distillation there are obtained as main product 72 g. of 4,6-octadien-2-one with the refraction $n_D^{20}=1.4958$, which can be still further purified by fractional distillation. Boiling point=31°/0.03 mm.; $n_D^{20}=1.4912$. UV spectrum in ethanol: maximum at 229 m$\mu$, $E_1^1=1100$. I.R. spectrum; band of the nonconjugated carbonyl at 5.80 and 5.85$\mu$. Odor: milder than that of the isomeric 3,5-octadien-2-one and with a fatty side note.

EXAMPLE 4

(a) Preparation of 7,10-dimethyl-4,5,9-undecatrien-2-one 10 mg. of p-toluenesulfonic acid and then (at a temperature of less than 30°) 85 g. of isopropenyl methyl ether are added to 76 g. of 3-hydroxy-4,7-dimethyl-6-octen-1-yne. The corresponding mixed acetone ketal [acetone-(4,7-dimethyl-6-octen-1-yn-3-yl) methyl ketal] first forms by exothermic reaction. This ketal intermediate product need not be isolated for the conversion into the allene ketone. The preparation of the ketone in pure condition is associated with losses inasmuch as it tends to break down into the starting components when distilled.

For conversion into the allene ketone, the reaction mixture is heated for one hour at 150° in a pressure vessel under 5 atm. of nitrogen. Because of the exothermic reaction which occurs, the temperature rise is controlled. After an hour the reaction mixture is cooled to room temperature and the acid neutralized with 1 ml. of triethyl amine. The mixture, diluted with an equal quantity of petroleum ether, is washed twice with 100 ml. of 10 percent sodium bicarbonate solution, then dried over sodium sulfate and finally evaporated at 60° in water jet vacuum. The residue is distilled in high vacuum, whereby 91 g. of 7,10-dimethyl-4,5,9-undecatrien-2-one are obtained. Boiling point=93–96°/0.09 mm.; $n_D^{20}=1.4870$; $d^{23}=0.88$. I.R. spectrum; allene band at 5.10$\mu$, band of the nonconjugated carbonyl at 5.87$\mu$. Odor: agreeably fatty, fruit- and somewhat caramel-like.

The 3-hydroxy-4,7-dimethyl-6-octen-1-yne used as starting material can be obtained in a known manner by ethynylation of 2,5-dimethyl-4-hexen-1-al with acetylene.

(b) Preparation of 7,10-dimethyl-3,5,9-undecatrien-2-one 76 g. of 3-hydroxy-4,7-dimethyl-6-octen-1-yne are reacted as described in the previous paragraph (a) together with 10 mg. of p-toluenesulfonic acid and 85 g. of isopropenyl methyl ether. The reaction mixture is heated at 150° for 1 hour in the pressure vessel and then neutralized with 1 ml. of triethyl amine. Thereupon the mixture is poured at 0–10° into a solution of 9 g. of sodium hydroxide in 180 ml. of methanol, whereby the isomerization of the allene ketone to the $\alpha,\beta$-$\gamma,\delta$-unsaturated ketone immediately occurs by exothermic reaction. After 15 minutes stirring, the isomerization product is neutralized with glacial acetic acid, mixed with an equal volume of petroleum ether and washed once with 180 ml. of water. After drying over sodium sulfate, the readily volatile constituents are distilled off in the 60° bath in water jet vacuum. The residue is distilled in high vacuum, whereby 38.7 g. of 7,10-dimethyl-3,5,9-undecatrien-2-one are obtained. Boiling point=83–87°/0.12 mm.; $n_D^{20}$=1.5122; $d^{23}$=0.88. UV spectrum in ethanol: maximum at 278 mµ, $E_1^1$=1220. Odor: fresh woody, somewhat fatty fruit-like, dry.

The course of the reactions described in the foregoing paragraphs (a) and (b) is conveniently followed by the thin-layer chromatogram; Silicagel G, 9 parts of carbon disulfide+1 part of ether, iodine vapor. The approximate $R_f$ values of the reaction products are:

0.2 for 3-hydroxy-4,7-dimethyl-6-octen-1-yne (sec. propargyl alcohol)
0.4 for 7,10-dimethyl-3,5,9-undecatrien-2-one (conjugated ketone)
0.5 for 7,10-dimethyl-4,5,9-undecatrien-2-one (allene ketone)
0.55 for 7,10-dimethyl-4,6,9-undecatrien-2-one (nonconjugated ketone)
0.7 for mixed ketal [acetone-(4,7-dimethyl-6-octen-1-yn-3-yl) methyl ketal].

EXAMPLE 5

(a) Preparation of acetone-(3-phenyl-1-propyn-3-yl) methyl ketal

By reaction of 1-propyn-3-phenyl-3-ol with isopropenyl methyl ether in the presence of an acidic agent there is obtained the corresponding acetone ketal [acetone-(3-phenyl-1-propyn-3-yl) methyl ketal]. Boiling point=89°/0.5 mm.; $n_D^{20}$=1.5064; $d^{24}$=1.002. Because cleavage into the starting components is readily effected, this ketone can be distilled undecomposed only with difficulty.

The 1-propyn-3-phenyl-3-oil used as starting material can be produced in a manner known by ethynylation of benzaldehyde with acetylene. Boiling point=81–83°/0.03 mm.; melting point=25°; $n_D^{20}$=1.5532.

(b) Preparation of 6-phenyl-4,5-hexadien-2-one 93 g. of 1-propyn-3-phenyl-3-ol, 152 g. of isopropenyl methyl ether, and 16 mg. of phosphoric acid are heated together at 150° in a pressure vessel for 1.5 hours. After working up, the reaction mixture is fractionally distilled. After a fore-run which contains unreacted mixed acetone ketal, the allene ketone [6-phenyl-4,5-hexadien-2-one] is obtained as a pale yellow oil of boiling point 110–116°/0.5 mm.; $n_D^{20}$=1.5644.

I.R. spectrum: allene band at 5.13µ; band of the nonconjugated carbonyl at 5.87µ. Balsamic odor with a slight side note of cinnamon and bitter almonds. After-odor very fine honey-and civet-like. Excellent adhesion.

(c) Preparation of 6-phenyl-3,5-hexadien-2-one

A mixture of 132 g. of 1-propyn-3-phenyl-3-ol, 500 mg. of p-toluenesulfonic acid, 5 ml. of pyridine and 220 g. of isopropenyl methyl ether is heated in an autoclave under 5 atm. nitrogen pressure. The reaction mixture is then cooled and distilled. At 101–116°/0.08 mm. 6-phenyl-3,5-hexadien-2-one is obtained directly as a rapidly solidifying yellow product which can be recrystallized from high boiling petroleum ether. Yield: 36 g. Melting point=74–75°. UV spectrum in ethanol: absorption at 234µ, $E_1^1$=410 and 322µ, $E_1^1$=2240. I.R. spectrum: strong band of the conjugated carbonyl at 6.08µ. Complex odor, reminiscent of raspberries, cassia, mimosa and cinnamon.

The course of the reactions described in the foregoing paragraphs (a), (b), and (c) is conveniently followed thin-layer chromatographically (silicagel G, 9 parts of $CS_2$=1 part of ether, iodine vapor), whereby approximately the following $R_f$ values are relied upon:

0.2 for 1-propyn-3-phenyl-3-ol (sec. propargyl alcohol)
0.4 for 6-phenyl-3,5-hexadien-2-one (conjugated diene ketone)
0.5 for 6-phenyl-4,5-hexadien-2-one (allene ketone)
0.7 for acetone-(3-phenyl-1-propyn-3-yl) methyl ketal (mixed acetone ketal).

EXAMPLE 6

(a) Preparation of 6-cyclohexyl-4,5-hexadien-2-one 27.4 g. of 1-propyn-3-cyclohexyl-3-ol are treated with 4 mg. of p-toluenesulfonic acid and 44 g. of isopropenyl methyl ether, while a temperature of less than 30° is maintained. The corresponding mixed acetone ketal [acetone-(3-cyclohexyl-1-propyn-3-yl) methyl ketal] forms by exothermic reaction. Without isolation of this ketal intermediate product, the mixture is heated at 120° for an hour (pressure vessel, 5 atm. of nitrogen). A ketal saponification is now carried out for easier separation of the unreacted ketal intermediate product from the desired allene ketone. For this purpose, the cooled reaction mixture is treated with 40 ml. of 10 percent sulfuric acid and 80 ml. of acetone. The saponification occurs immediately so that the mixture can be worked up without delay. The allene ketone [6-cyclohexyl-4,5-hexadien-2-one] is obtained as a pale yellow oil of boiling point 75–76°/0.06 mm.; $n_D^{20}$=1.4998; $d^{23}$=0.95. I.R. spectrum: strong allene band at 5.11µ; band of the nonconjugated carbonyl at 5.87µ. Odor: fresh balsamic, fruit-like (carob bean) and flowery jasmine-like.

The 1-propyn-3-cyclohexyl-3-ol used as starting material can be produced in a known manner by ethynylation of hexahydrobenzaldehyde with acetylene. Boiling point=61–62°/0.15 mm.; $n_D^{20}$=1.4863.

(b) Preparation of 6-cyclohexyl-3,5-hexadien-2-one 27.4 g. of 1-propyn-3-cyclohexyl-3-ol, 4 mg. of p-toluenesulfonic acid and 44 g. of isopropenyl methyl ether are reacted at 120° for one hour in a pressure vessel as described in (a). The cooled reaction mixture is then poured into a solution of 2 ml. of 30 percent caustic soda in 50 ml. of methanol. The isomerization of the allene ketone to the conjugated diene ketone occurs exothermically. The reaction mixture is now neutralized with glacial acetic acid and the methanol evaporated in vacuum in a 60° bath. The residue is subjected to a ketal saponification by addition of 40 ml. of 10 percent sulfuric acid and 80 ml. of acetone. After working up there is obtained 6-cyclohexyl-3,5-hexadien-2-one as a yellowish liquid of boiling point 73–74°/0.06 mm.; $n_D^{20}$=1.5340; $d^{23}$=0.95. UV spectrum in ethanol: maximum at 278 mµ, $E_1^1$=1400°. I.R. spectrum: band of the conjugated carbonyl at 6.03µ. Odor: very fine, flowery fruit-like; slightly fatty, suitable, primarily for jasmin, lilac or ylang bases. Excellent adhesion.

The course of the reactions described in the foregoing paragraphs (a) and (b) is conveniently followed by thin-layer chromatography with the following approximate $R_f$ values as a basis (silicagel G, 9.5 parts of $CS_2$ 0.5 part of ether, iodine vapor):

0.2 for 1-propyn-3-cyclohexyl-3-ol (sec. propargyl alcohol)
0.5 for 6-cyclohexyl-3,5-hexadien-2-one (conjugated diene ketone)
0.55 for 6-cyclohexyl-4,5-hexadien-2-one (allene ketone)
0.6 for 6-cyclohexyl-4,6-hexadien-2-one (nonconjugated diene ketone)
0.65 for acetone-(3-cyclohexyl-1-propyn-3-yl) methyl ketal (mixed acetone ketal).

What is claimed is:

1. A process of producing an allene ketone of the formula:

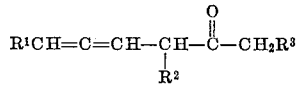

wherein R¹ is a hydrocarbon group having from 1 to 12 carbon atoms and R² and R³ are selected from the group consisting of hydrogen and lower hydrocarbon groups which can be bound with each other, which comprises heating in the presence of an acid catalyst a ketal of the formula:

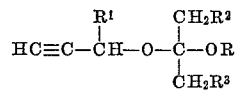

wherein R is a lower alkyl group and R¹, R² and R³ are as above to a temperature of from about 80° C. to about 200° C. to form said allene ketone.

References Cited

UNITED STATES PATENTS

| | | | |
|---|---|---|---|
| 3,029,287 | 4/1962 | Marbet | 260—586 |
| 3,337,634 | 8/1967 | Thompson | 260—593 |

OTHER REFERENCES

Nazarov et al.: "Chem. Abst.," vol. 53, col. 1123h (1959).

Raphael, "Adv. in Org. Chem.," vol. 3.

Juvet et al., "J. Am. Chem. Soc.," vol. 83, pp. 1560 and 1563 (1961).

LEON ZITVER, Primary Examiner

MATTHEW M. JACOB, Assistant Examiner

U.S. Cl. X.R.

252—522; 260—554, 590, 593, 611, 615, 617, 618